United States Patent [19]

Lee

[11] 4,126,050

[45] Nov. 21, 1978

[54] VIBRATOR

[75] Inventor: George A. Lee, Malvern, England

[73] Assignee: Ronald Melville-Smith, England

[21] Appl. No.: 784,858

[22] Filed: Apr. 5, 1977

[30] Foreign Application Priority Data

Apr. 14, 1976 [GB] United Kingdom ............... 15187/76

[51] Int. Cl.[2] ............................................. F16H 21/16

[52] U.S. Cl. ......................................... 74/26; 366/116

[58] Field of Search ........................ 74/26, 61; 366/116

[56] References Cited

U.S. PATENT DOCUMENTS

| | | | |
|---|---|---|---|
| 1,690,901 | 11/1928 | James | 74/26 |
| 1,757,320 | 5/1930 | Lide | 74/26 |
| 3,250,380 | 5/1966 | Allen et al. | 74/26 |

*Primary Examiner*—Benjamin W. Wyche
*Assistant Examiner*—Wesley S. Ratliff, Jr.
*Attorney, Agent, or Firm*—Holman & Stern

[57] ABSTRACT

This invention relates to a vibrator which for example can be used to vibrate a tray for the purpose of conveying articles or material along the tray or alternatively can be used for vibrating articles or material where there is no requirement for conveyance in a pre-determined direction. A vibrator according to the invention has an actuator assembly which includes an actuator shaft which can rotate relative to said assembly but which is prevented from longitudinal movement relative to the assembly. The actuator shaft is connected at one end to power-actuated driving means and means are provided for displacing the actuator assembly between a position in which the axis of rotation of the driving means is co-incident with the axis of rotation of the actuator shaft so that rotation of the latter will not result in any longitudinal oscillation of the actuator shaft and actuator assembly and a position in which the axis of rotation of the actuator shaft is set in a direction in which it is inclined to the axis of rotation of the driving means so that rotation of the actuator shaft will result in longitudinal oscillation of the actuator shaft and actuator assembly.

12 Claims, 4 Drawing Figures

VIBRATOR

This invention relates to a vibrator which may be used, for example, in association with a tray for the purpose of feeding articles or materials in a desired direction, or which may be used for vibrating articles or materials which are not required to be conveyed in a predetermined direction, the object of the invention being to provide such a vibrator in an improved form.

In accordance with the invention there is provided a vibrator having an actuator assembly which includes an actuator shaft mounted for rotation about its axis relative to said assembly but prevented from longitudinal movement in a direction parallel to its axis relative to said assembly, said actuator shaft being connected at one end to power-actuated driving means which are rotatable to rotate said actuator shaft, means being also provided for displacing said actuator assembly between a position in which the axis of rotation of said driving means is co-incident with the axis of rotation of said actuator shaft so that rotation of the latter will not result in any longitudinal oscillation of said actuator shaft and actuator assembly and a position in which the axis of rotation of said actuator shaft is set in a direction in which it is inclined to the axis of rotation of said driving means in such a manner that rotation of said actuator shaft will result in longitudinal oscillation of said actuator shaft and actuator assembly, said actuator assembly being connectible to a member which in use is to be vibrated whereby such longitudinal oscillation of the actuator assembly will effect vibration of said member.

Conveniently, there is provided a further shaft which is connected to said actuator assembly in such a way that longitudinal oscillation of said assembly will result in angular oscillation of said further shaft which in turn is connectible to said member which is to be vibrated so that the oscillation of the further shaft in use will effect vibration of said member.

The invention will now be more particularly described with reference to the accompanying drawings wherein FIG. 1 is a part-sectional plan view of one example of a vibrator constructed in accordance with the present invention, with the vibrator being shown in an inoperative or non-vibrating position, FIG. 2 is a longitudinal sectional elevation taken along the line 2—2 of FIG. 1

Figure 2:
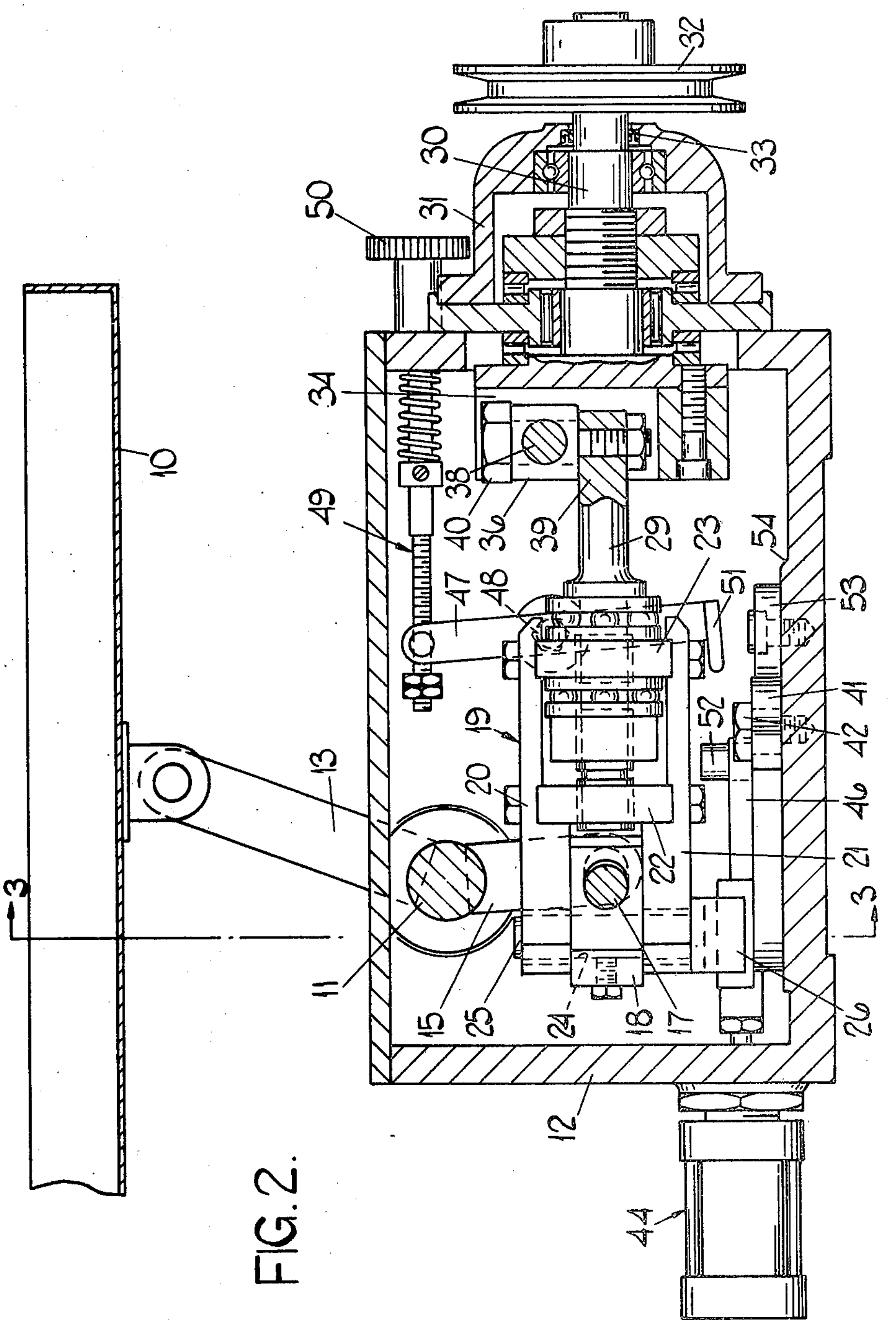
Figure 3:
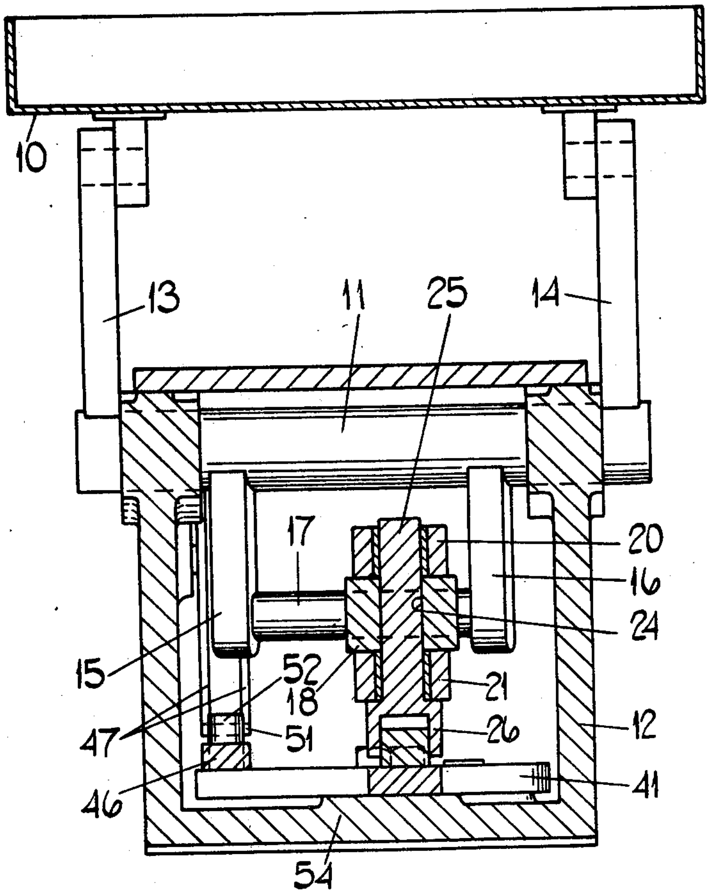
FIG. 3 is a cross-sectional end view taken along the line 3—3 of FIG. 2.

Referring now to the drawings the actuator shown therein may be used, for example, in association with a tray which is required to be vibrated for the purpose of feeding articles in a desired direction. The tray is indicated by reference numeral 10 in FIGS. 2 and 3 and the apparatus illustrated is provided with an oscillatable shaft 11 which extends in a horizontal direction through a housing 12 and which is provided at its two ends outside the housing with arms 13 and 14 which are connected to said tray so that in use, as will be later explained, the shaft 11 will oscillate about its axis so as thereby to impart a rocking motion to the arms 13 and 14 and to the associated tray.

Within the interior of said housing said oscillatable shaft 11 is connected to at least one and as shown two projecting arms 15 and 16 and the lower ends of said arms are connected by a cylindrical bar 17, said arms 15 and 16 and the bar 17 being arranged so that the axis of the latter is slightly inclined to the axis of said shaft 11. Slidably mounted on said bar 17 is a block 18 which forms part of an actuator assembly generally indicated by reference numeral 19. Said assembly also includes a pair of horizontally extending vertically spaced strips 20 and 21 which are connected together by means of spacers 22 and 23 (see FIG. 2). Furthermore said block 18 is formed with a vertically extending bore 24 which is aligned with corresponding bores formed in the adjacent ends of strips 20 and 21 so that the aligned bores are adapted to receive a cylindrical stem 25 projecting upwardly from a yoke member 26.

The actuator assembly also includes bearings 27 and 28 which serve to support an actuator shaft 29. Said shaft 29 can thus rotate relative to the actuator assembly about its own axis but it is prevented from longitudinal movement relative to said assembly. Further, at its end remote from said block 18, the shaft 29 is connected to driving means comprising a driving member 30 which projects through an end cap 31 secured to the housing 12 and having at its outer end a driving pulley 32 adapted to be connected to a driving electric motor (not shown) through a driving belt. There is also provided between driving member 30 and the end cap 31 an oil seal 33 (see FIG. 2) so that the interior of said housing 12 can be partially filled with oil for the purpose of lubrication of the working parts in use. The driving member 30 is supported within said housing end cap on suitable bearings and is formed at its inner end with a pair of spaced parallel cheeks 34 and 35 and said cheeks support a block 36 having a pair of trunnions 37 and 38 so that said block 36 is pivotable relative to the cheeks 34 and 35 about an axis which is perpendicular to the rotational axis of driving member 30 but displaced therefrom. The adjacent end of the shaft 29 is formed with a collar or bearing 39 which is adapted to receive a bolt 40 which extends through said block 36 so that the shaft 29 and with it the whole actuator assembly 18 can swing relative to the driving member 30 about an axis which is coincident with the axis of said bolt 40 and can also swing about said trunnions 37 and 38.

There is also provided a control lever 41 which is mounted in the base of the housing 12 and which is pivotable on a pivot 42. Said lever 41 is of generally T-shaped form and is provided at a position remote from said pivot 42 with a rectangular block 43 which is mounted so as to be pivotable relative to the lever 41 about a vertical axis. The aforesaid yoke member 26 embraces the block 43 and the arrangement is such that pivotal movement of the lever 41 about its pivot 42 will have the effect of moving the block 18 towards one side of the housing 11 or the other, said block sliding along said bar 17 during such movement.

For the purpose of pivoting said lever 41 on its pivot 42 there is provided an air operated piston and cylinder unit generally indicated by reference numeral 44 and connected through the housing 12 to one end 45 of the lever 41 by means of a rod 46. There is also provided a stop lever 47 which is pivoted about a horizontal pivot 48 to the housing but which is capable of being pivoted by means of a screw and nut mechanism generally indicated by reference numeral 49 by means of a knob 50 disposed on the exterior of the housing. The lower end of said lever 47 has a foot 51 which is adapted to engage a short post 52 projecting upwardly from the lever 41 at said end 45 of the lever 41 so that the position of said foot 51 the lever 47 will determine how far the lever 41 can be turned on its pivot 42 by means of the air cylinder 44.

Figure 1:
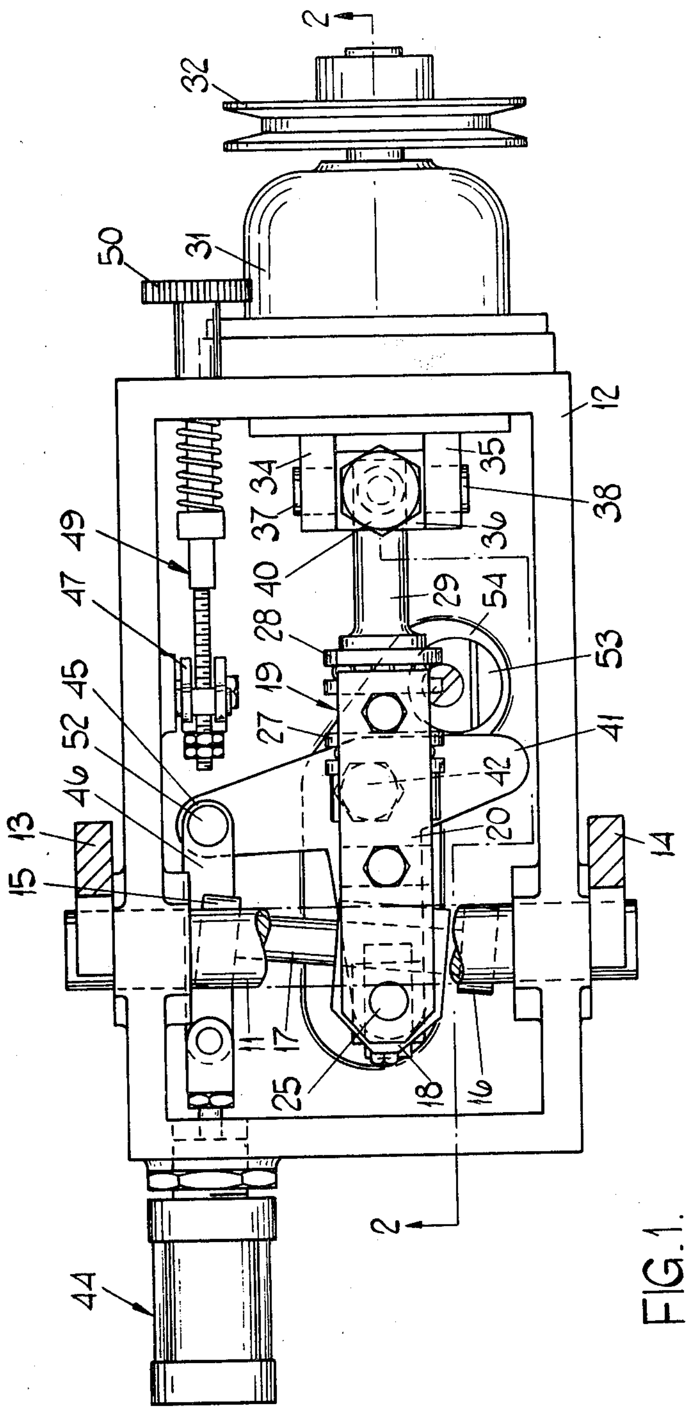
Figure 4:
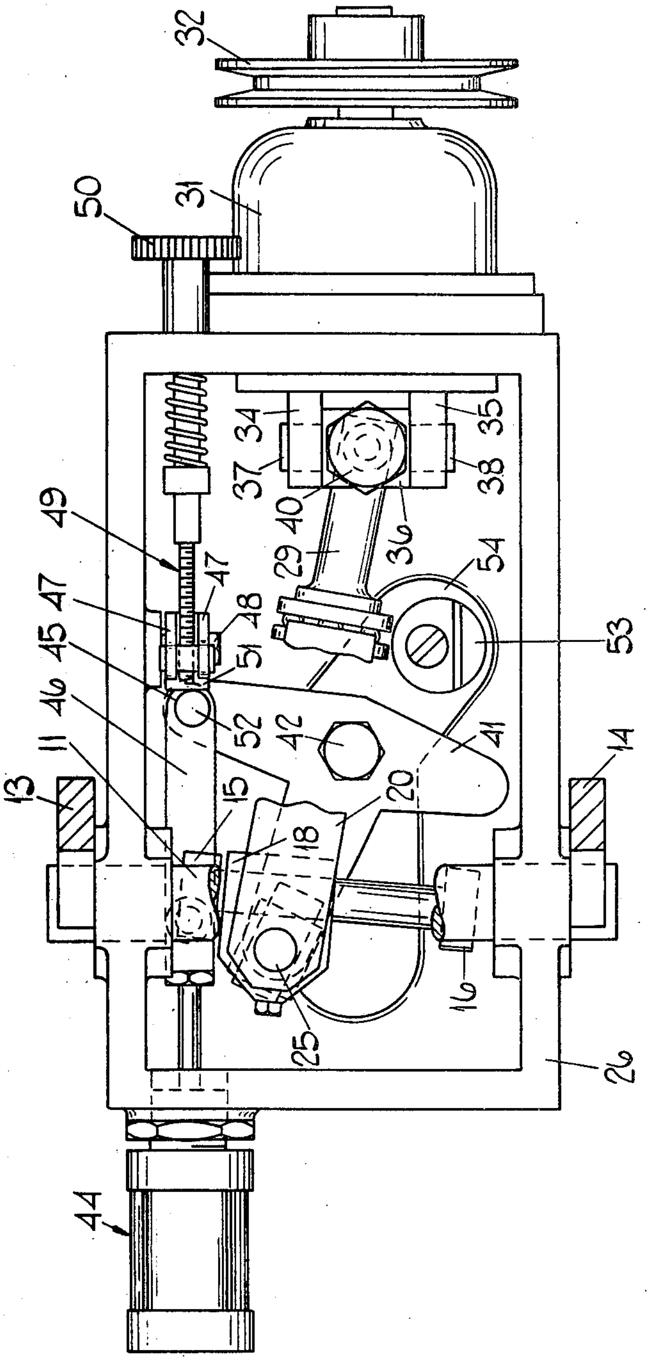
FIG. 4 is a further part-sectional plan view but showing the vibrator in an operative, vibrating position.

Initially the aforesaid actuator assembly 19 can be set, by means of air cylinder 44, in a position as shown in FIG. 1 in which the axis of shaft 29 is coincident with the axis of the driving member 30 and in which a part of the lever 47 engages a stop 53 mounted on a pad 54 formed integrally with the base of the housing 12, said stop 53 being initially adjustable to ensure that when it is engaged by said lever 47, the axis of shaft 29 will be coincident with the axis of driving member 30 as aforesaid. In this position rotation of said driving member by rotation of the driving pulley 32 will not result in any longitudinal movement of the shaft 29 and thus there will be no longitudinal movement of the actuator assembly 19. The arms 15 and 16 will thus not be oscillated so that the oscillatable shaft 11 and the arms 13 and 14 will remain stationary and therefore the vibrator will be stopped. Said actuator assembly 19 can however be moved by means of the air cylinder 44 acting on the lever 41 as above explained so that the axis of said shaft 29 is no longer coincident with the axis of the driving member 30. In other words the block 18 will be displaced laterally from its initial position, (as shown in FIG. 4) the amount of displacement depending upon the setting of the stop lever 47. In such a position however rotation of the shaft 29 by means of the driving member 30 will also result in longitudinal movement of said shaft (the block 36 meanwhile rocking about the axis of the trunnions 37 and 38) and therefore similar longitudinal movement of the actuator assembly 19. This longitudinal movement will be communicated to the arms 15 and 16 so that the shaft 11 and arms 13 and 14 will be rocked to vibrate the tray 10 which is attached to said arms 13 and 14. The amplitude of such vibrations will of course depend on the displacement of said block 18.

A vibrator formed as above described will provide a positive drive in use in both directions of movement of the tray. In other words it is not necessary to rely on a spring return as is common with conventional forms of vibrators. Furthermore a vibrator constructed in accordance with the present invention has the characteristic that when the actuator assembly 19 is returned to its aligned or initial position, the oscillation of shaft 11, and thus the vibration imparted to the aforesaid tray, will stop very quickly and there will therefore be no time lag when it is desired to bring the vibrator to a halt.

As above-described, a piston and cylinder unit 44 is used to move the lever 41 between its operative and inoperative positions. As an alternative, or in addition, said lever 41 may be connected to a manually operable linkage (not shown) which extends through the housing 12 whereby the lever can be turned by hand if desired.

Furthermore, although reference has been made above to the use of the vibrator for feeding articles or material along a tray, it is to be understood that a vibrator constructed in accordance with the invention may be used for vibrating other objects, such as for example a sieve, where a feeding or conveying movement is not required.

I claim:

1. A vibrator having an actuator assembly which includes an actuator shaft mounted for rotation about its axis relative to said assembly but prevented from longitudinal movement in a direction parallel to its axis relative to said assembly, said actuator shaft being connected at one end to power-actuated driving means which are rotatable to rotate said actuator shaft, means being also provided for displacing said actuator assembly between a position in which the axis of rotation of said driving means is co-incident with the axis of rotation of said actuator shaft so that rotation of the latter will not result in any longitudinal oscillation of said actuator shaft and actuator assembly and a position in which the axis of rotation of said actuator shaft is set in a direction in which it is inclined to the axis of rotation of said driving means in such a manner that rotation of said actuator shaft will result in longitudinal oscillation of said actuator shaft and actuator assembly, said actuator assembly being connectible to a member which in use is to be vibrated whereby such longitudinal oscillation of the actuator assembly will effect vibration of said member.

2. The vibrator as claimed in claim 1 wherein there is provided a further shaft which is connected to said actuator assembly so that longitudinal oscillation of said assembly will result in angular oscillation of said further shaft which is itself connectible to said member which is to be vibrated so that the oscillation of said further shaft in use will effect vibration of said member.

3. The vibrator as claimed in claim 2 wherein said actuator assembly includes a block which is mounted for angular movement about an axis perpendicular to the axis of said actuator shaft, said block being slidable along a bar which is connected to but spaced from said further shaft.

4. The vibrator as claimed in claim 3 wherein the axis of said bar is inclined to the axis of said further shaft and is connected thereto by means of a pair of arms.

5. The vibrator as claimed in claim 2 wherein said actuator assembly is mounted in a sealed housing and wherein said further shaft is connected to arms which extend externally of the housing and which are themselves connected to the member which is to be vibrated.

6. The vibrator as claimed in claim 1 wherein said power-actuated driving means embodies a rotatable driving member which is formed with a pair of spaced parallel cheeks which support a block having a pair of trunnions arranged so that said block is pivotable on the trunnions about an axis which is perpendicular to the rotational axis of said driving member, said one end of the actuator shaft being connected to the trunnioned block so as to be pivotable relative thereto about an axis which is perpendicular both to said trunnion axis and said rotational axis of the driving member.

7. The vibrator as claimed in claim 1 wherein said means for displacing said actuator assembly comprises a pivoted lever to which said assembly is connected and which is pivotable by a fluid-pressure actuated unit.

8. The vibrator as claimed in claim 1 wherein said means for displacing said actuator assembly comprises a pivoted lever to which said assembly is connected and which is manually pivotable.

9. The vibrator as claimed in claim 1 wherein adjustable stop means are provided for predetermining the position of said actuator assembly when it is in said position in which the axis of rotation of said actuator shaft is inclined to the axis of rotation of said driving means.

10. The vibrator as claimed in claim 9 wherein further adjustable stop means are provided for locating the position of said actuator assembly in which the axis of rotation of said driving means is co-incident with the axis of rotation of said actuator shaft.

11. The vibrator as claimed in claim 9 wherein said means for displacing said vibrator assembly comprises a pivoted lever to which said assembly is connected and wherein said adjustable stop means are engageable with said pivoted lever.

12. The vibrator as claimed in claim 10 wherein said means for displacing said actuator assembly comprises a pivoted lever to which said assembly is connected and wherein said further adjustable stop means are engageable with said pivoted lever.

* * * * *